June 7, 1966 B. C. PHILLIPS 3,254,880
CHARGE FORMING APPARATUS
Original Filed Nov. 27, 1959 6 Sheets-Sheet 1
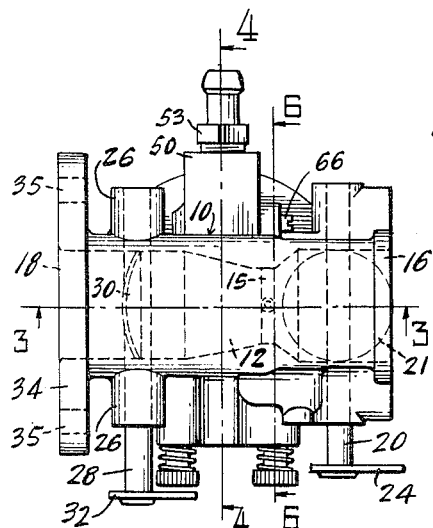
FIG-2-
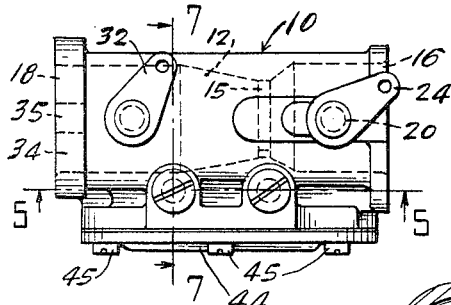
FIG-1-
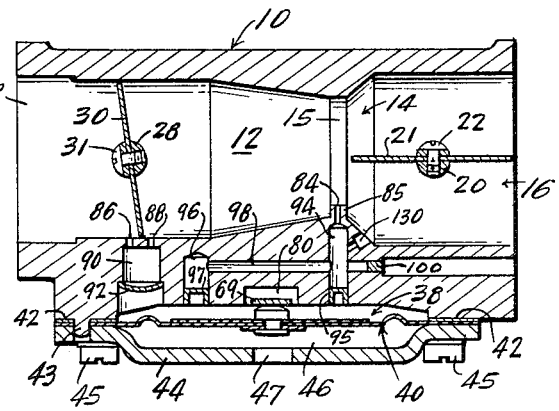
FIG-5-
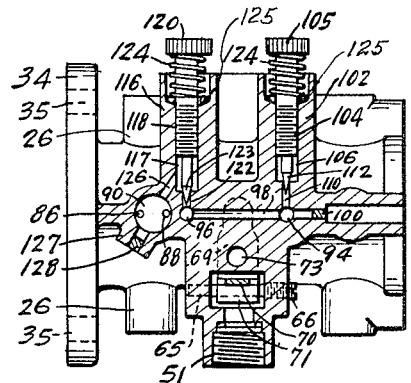
FIG-7-
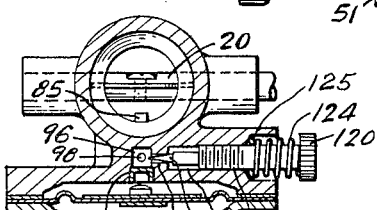
FIG-6-
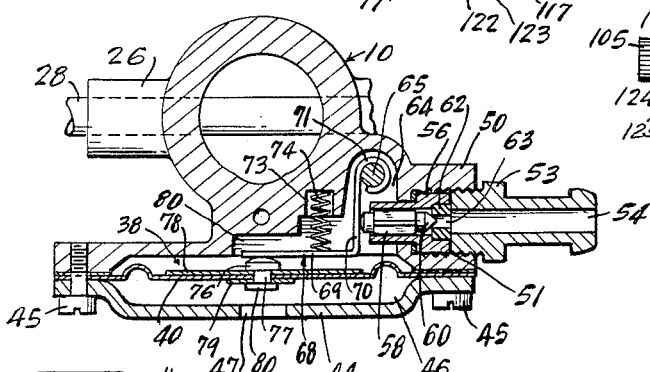
FIG-4-
INVENTOR:
BERNARD C. PHILLIPS.
BY
ATTORNEY June 7, 1966 B. C. PHILLIPS 3,254,880
CHARGE FORMING APPARATUS
Original Filed Nov. 27, 1959 6 Sheets-Sheet 2
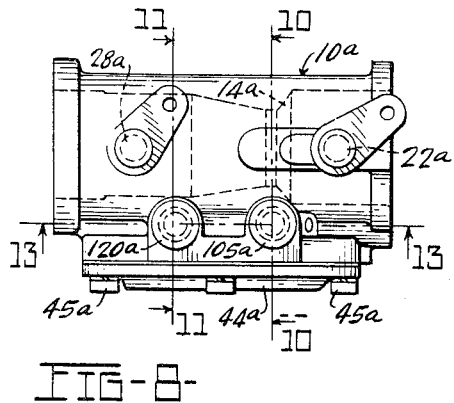
FIG-8-
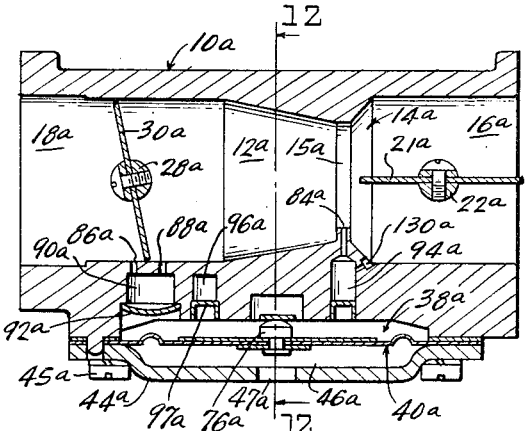
FIG-9-
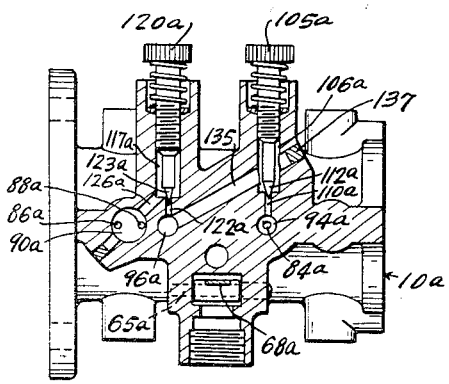
FIG-13-
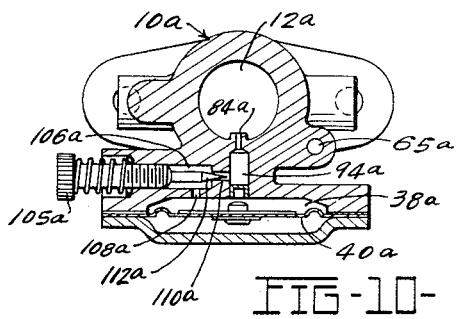
FIG-10-
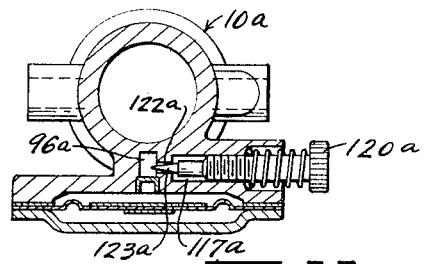
FIG-11-
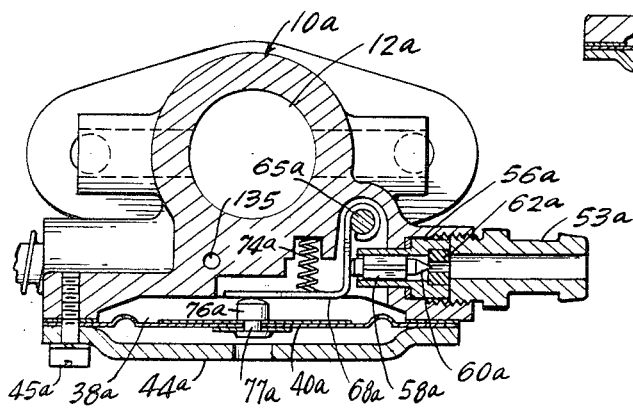
FIG-12-
INVENTOR:
BERNARD C. PHILLIPS.
BY
ATTORNEY June 7, 1966  B. C. PHILLIPS  3,254,880
CHARGE FORMING APPARATUS
Original Filed Nov. 27, 1959  6 Sheets-Sheet 3
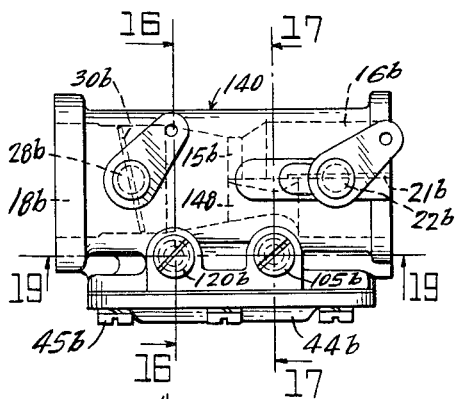
FIG-14-
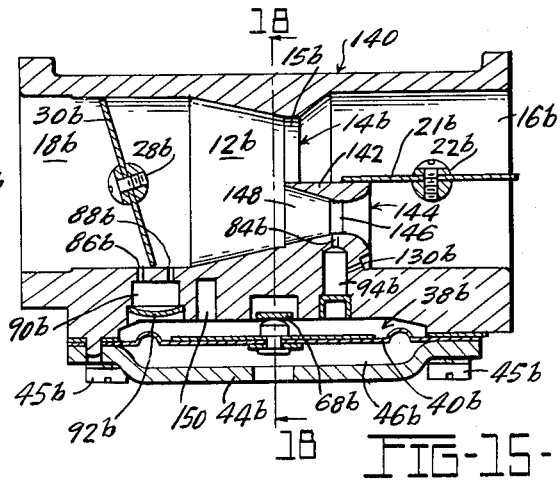
FIG-15-
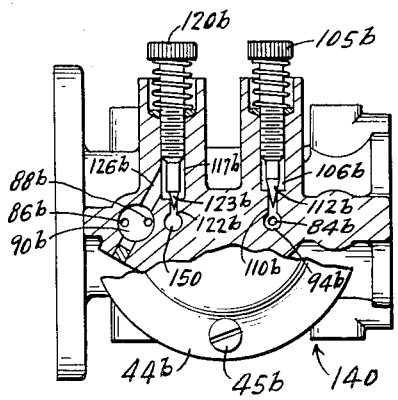
FIG-19-
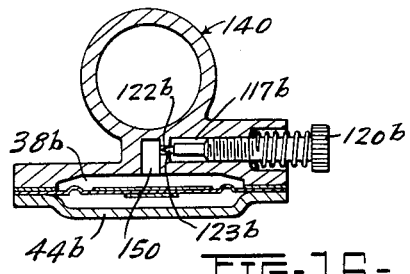
FIG-16-
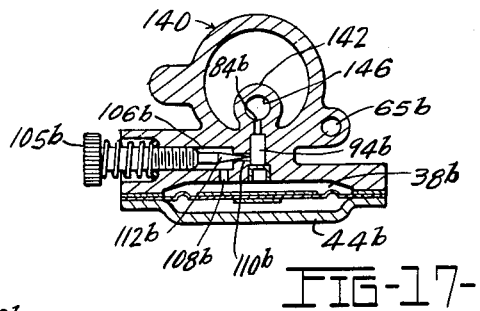
FIG-17-
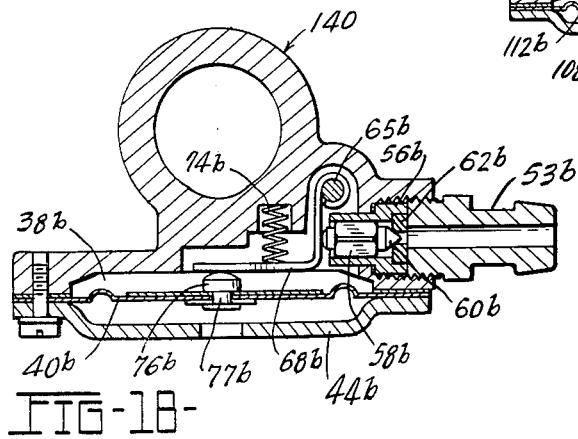
FIG-18-
INVENTOR:
BERNARD C. PHILLIPS.
BY
ATTORNEY June 7, 1966 B. C. PHILLIPS 3,254,880
CHARGE FORMING APPARATUS
Original Filed Nov. 27, 1959 6 Sheets-Sheet 4
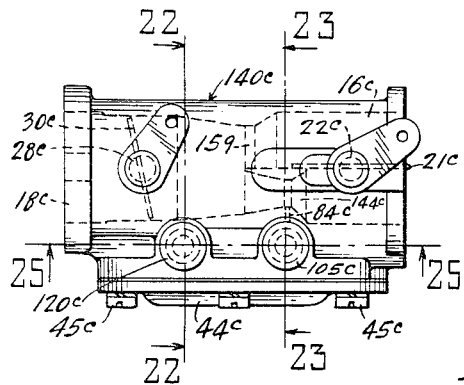
FIG-20-
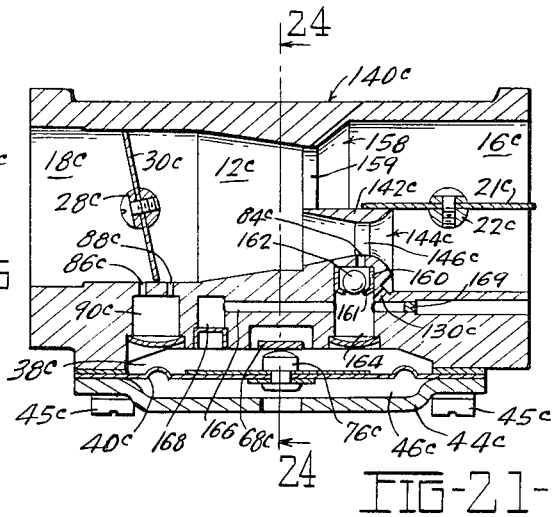
FIG-21-
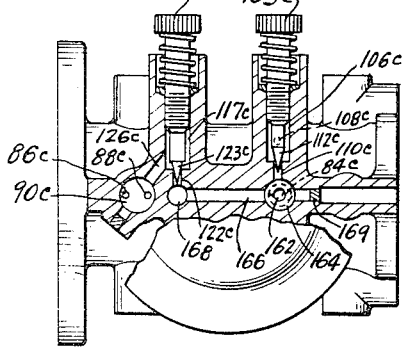
FIG-25-
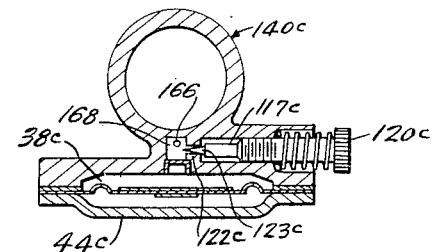
FIG-22-
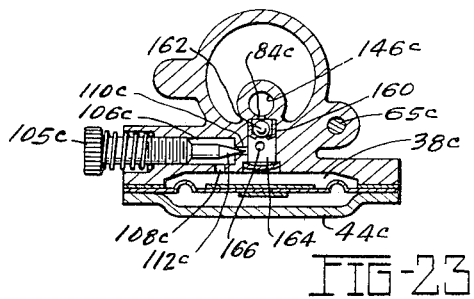
FIG-23-
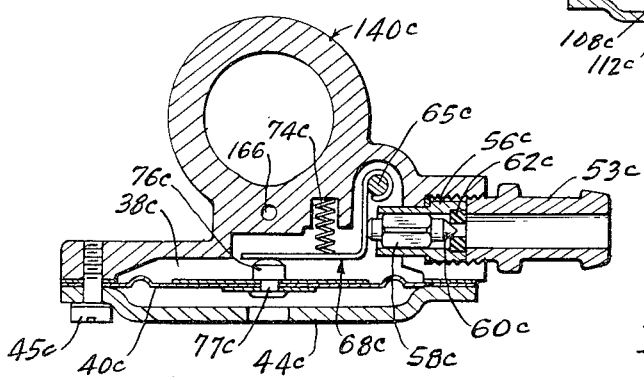
FIG-24-
INVENTOR:
BERNARD C. PHILLIPS.
BY
ATTORNEY June 7, 1966  B. C. PHILLIPS  3,254,880
CHARGE FORMING APPARATUS
Original Filed Nov. 27, 1959  6 Sheets-Sheet 5
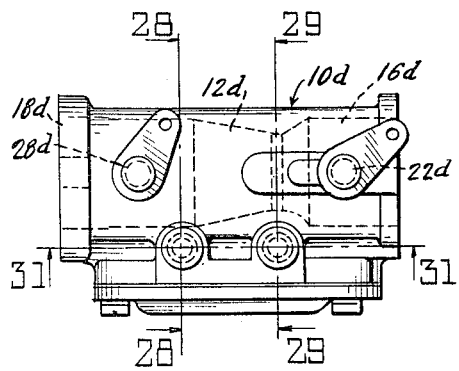
FIG-26-
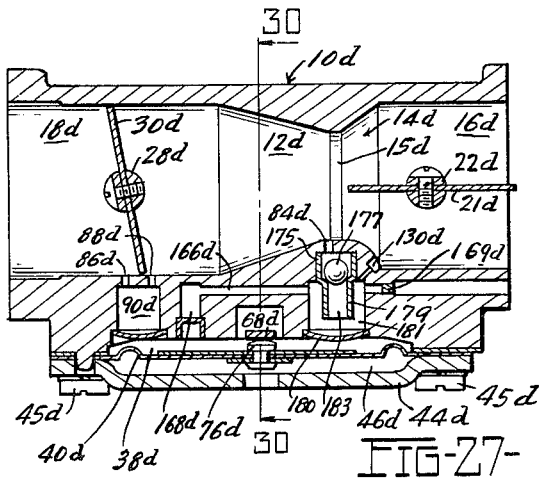
FIG-27-
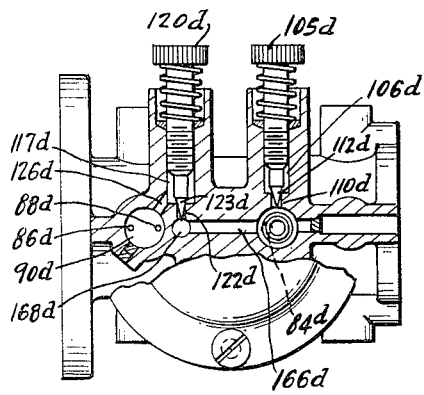
FIG-31-
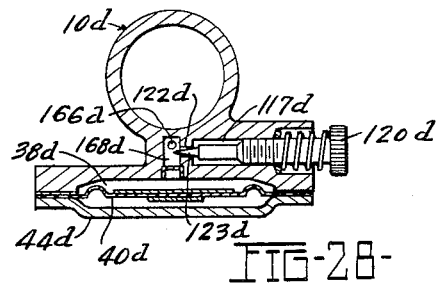
FIG-28-
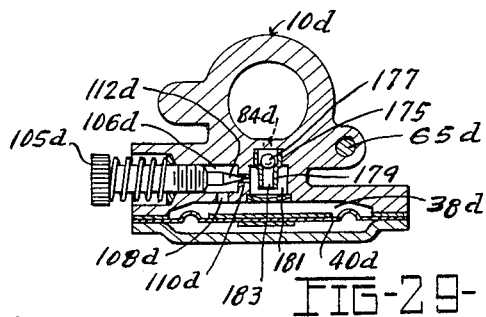
FIG-29-
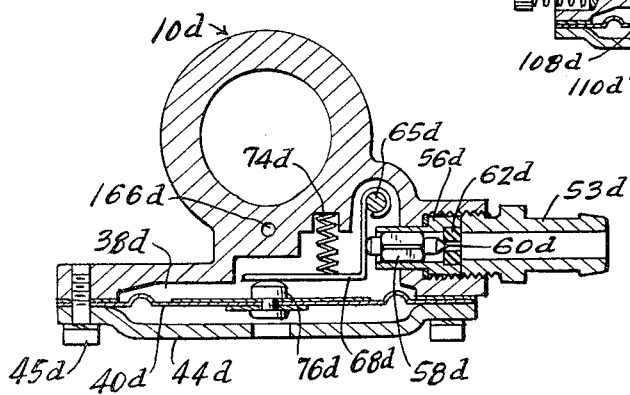
FIG-30-
INVENTOR:
BERNARD C. PHILLIPS.
BY
ATTORNEY

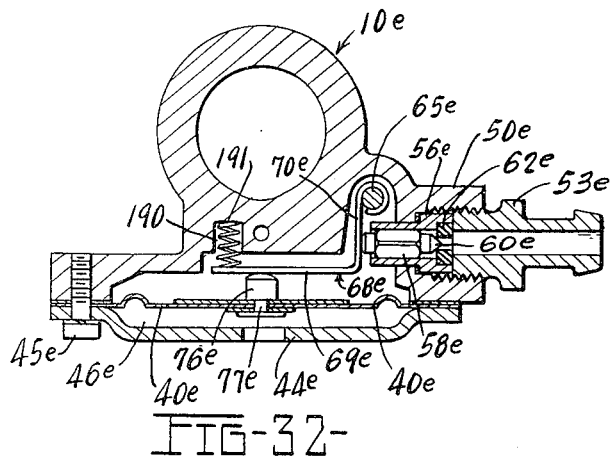
FIG-32-
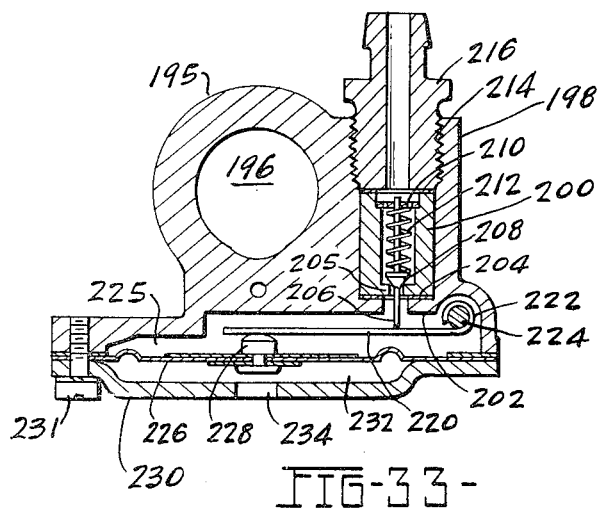
FIG-33-

United States Patent Office 3,254,880
Patented June 7, 1966

3,254,880
CHARGE FORMING APPARATUS
Bernard C. Phillips, Toledo, Ohio, assignor to The Tillotson Manufacturing Company, Toledo, Ohio, a corporation of Ohio
Continuation of application Ser. No. 855,688, Nov. 27, 1959. This application July 15, 1963, Ser. No. 295,123
6 Claims. (Cl. 261—41)

This is a continuation of my application Serial No. 855,688, filed November 27, 1959, now abandoned.

This invention relates to charge forming apparatus or carburetor for use with internal combustion engines and more especially to charge forming apparatus of the diaphragm type especially adapted for delivering combustible mixture to internal combustion engines which are adapted for use in various angular positions.

Internal combustion engines, and especially those of comparatively small horsepower, are used extensively for powering chain saws, lawnmowers, small boats and similar uses where the engine and charge forming apparatus are sometimes tilted to extreme angular positions, and engines used for powering lawnmowers sometimes traverse rough terrain causing substantial vibration of the engine and charge forming apparatus.

The conventional type of charge forming apparatus or carburetor embodying a float-actuated fuel inlet control valve is unsatisfactory for use with engines which are operated in substantial angular positions or subjected to excessive vibration. Charge forming devices embodying diaphragm controlled fuel inlet valve means have been used and have overcome some of the disadvantages of float-controlled devices.

The present invention embraces a charge forming apparatus of the diaphragm type in which the components and fuel channels or passages are arranged in a compact manner whereby the charge forming apparatus may be manufactured in substantial quantities and at low cost.

Another object of the invention is provision of a diaphragm type carburetor embodying an improved lever and valve arrangement for controlling fuel flow from a supply into the carburetor which is of compact construction effecting a substantial reduction in the weight of the carburetor.

Another object of the invention is the provision of a diaphragm type carburetor provided with a shallow fuel chamber or passage disposed close to the air and fuel mixing passage facilitating the transfer or delivery of fuel from the inlet to the mixing passage with a minimum of lift or differential pressure in the mixing passage and in which the delivery of the fuel into the mixing passage is controlled by engine aspiration.

Another object of the invention is the provision of a carburetor or charge forming apparatus capable of providing for modification of the fuel channels or metering system and adjustments in order to facilitate a wide scope of calibration to adapt the carburetor to various types and sizes of engine and operating conditions, the carburetor embodying a metering arrangement adaptable to operating conditions of two or four cycle engines of the single cylinder or multi-cylinder type.

A further object of the invention is the provision of a diaphragm type of carburetor embodying a diaphragm actuated lever construction and fuel inlet control valve arrangement fostering improved stability of fuel flow control and which does not vibrate appreciably under adverse operating conditions such as movement of the engine and carburetor encountered with a power driven lawnmower and thereby obtain better fuel economy.

A further object of the invention is the provision of carburetor embodying a diaphragm-actuated fuel flow control means facilitating the placement of the fuel inlet on a side of the carburetor and wherein the diaphragm is instantly responsive to minute variations in pressure in a mixing passage whereby the fuel requirements of the engine are satisfied at all engine speeds.

Still another object of the invention resides in a carburetor of the diaphragm type wherein fuel is delivered into a mixing passage under the influence of engine aspiration and operable with a minimum of lift or differential pressure.

Still a further object of the invention is the provision of a diaphragm type carburetor embodying a fuel flow control system, including a lever of the second order of levers providing a compact construction which is highly sensitive to minute pressure variations in the mixing passage and yet effects a stable control of the fuel flow under adverse operation conditions.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a side elevational view illustrating the form of charge forming apparatus or carburetor of the invention;

FIGURE 2 is a top plan view of the charge forming device or carburetor shown in FIGURE 1;

FIGURE 3 is an enlarged longitudinal sectional view taken substantially on the line 3—3 of FIGURE 2;

FIGURE 4 is an enlarged transverse sectional view taken substantially on the line 4—4 of FIGURE 2;

FIGURE 5 is a sectional view taken substantially on the line 5—5 of FIGURE 1;

FIGURE 6 is a transverse sectional view taken substantially on the line 6—6 of FIGURE 2;

FIGURE 7 is a transverse sectional view taken substantially on the line 7—7 of FIGURE 1;

FIGURE 8 is a side elevational view illustrating a modified form of carburetor of the invention;

FIGURE 9 is an enlarged longitudinal sectional view of the carburetor shown in FIGURE 8;

FIGURE 10 is a transverse sectional view taken substantially on the line 10—10 of FIGURE 8;

FIGURE 11 is a transverse sectional view taken substantially on the line 11—11 of FIGURE 8;

FIGURE 12 is an enlarged transversed sectional view taken substantially on the line 12—12 of FIGURE 9;

FIGURE 13 is a sectional view taken substantially on the line 13—13 of FIGURE 8;

FIGURE 14 is a side elevational view illustrating another form of carburetor of the invention;

FIGURE 15 is an enlarged longitudinal sectional view through the carburetor illustrated in FIGURE 14;

FIGURE 16 is a transverse sectional view taken substantially on the line 16—16 of FIGURE 14;

FIGURE 17 is a transverse sectional view taken substantially on the line 17—17 of FIGURE 14;

FIGURE 18 is an enlarged transverse sectional sectional view taken substantially on the line 18—18 of FIGURE 15;

FIGURE 19 is a sectional view taken substantially on the line 19—19 of FIGURE 14;

FIGURE 20 is an elevational view illustrating modified form of carburetor of the invention;

FIGURE 21 is an enlarged longitudinal sectional view through the carburetor construction of FIGURE 20;

FIGURE 22 is a transverse sectional view taken substantially on the line 22—22 of FIGURE 20;

FIGURE 23 is a transverse sectional view taken substantially on the line 23—23 of FIGURE 20;

FIGURE 24 is an enlarged transverse sectional view taken substantially on the line 24—24 of FIGURE 21;

FIGURE 25 is a sectional view taken substantially on the line 25—25 of FIGURE 20;

FIGURE 26 is a side elevational view of another form of carburetor of the invention;

FIGURE 27 is an enlarged longitudinal sectional view of the carburetor shown in FIGURE 26;

FIGURE 28 is a transverse sectional view taken substantially on the line 28—28 of FIGURE 26;

FIGURE 29 is a transverse sectional view taken substantially on the line 29—29 of FIGURE 26;

FIGURE 30 is an enlarged transverse sectional view taken substantially on the line 30—30 of FIGURE 27;

FIGURE 31 is a sectional view taken substantially on the line 31—31 of FIGURE 26;

FIGURE 32 is a transverse sectional view showing a modified form of float control lever and spring arrangement of the invention, and FIGURE 33 is a sectional view illustrating a modified form of fuel inlet valve and lever control mechanism.

While the charge forming apparatus or carburetor of the present invention illustrated in the drawings is particularly adapted for supplying fuel and air mixture to internal combustion engines of the two cycle type, it is to be understood that the charge forming apparatus of the invention may be utilized with other types of internal combustion engine such as those of the four cycle type or wherever a diaphragm type carburetor or charge forming apparatus may be found to have utility.

It should be noted that in all forms of the carburetor or charge forming apparatus of the invention disclosed that the lever construction for transmitting or transferring movement of the diaphragm to a valve for controlling the fuel inlet of the carburetor is of the second order of levers wherein the fulcrum of the lever is disposed at one end thereof and is preferably of a right angle configuration or shape providing a compact diaphragm, lever and inlet valve construction which is highly sensitive to minute pressure variations in the mixing passage yet providing for improved stability and immunity from vibration such as would adversely affect the fuel economy.

In all forms of the invention disclosed the fuel transfer or diaphragm chamber in the carburetor body is shallow and is disposed close to the mixing passage whereby a minimum lift is afforded for the aspiration of fuel from the diaphragm chamber into the mixing passage. The small amount of fuel in the diaphragm chamber has a minimum effect upon the diaphragm position whereby the diaphragm is instantly responsive to minute variations in pressure in the mixing passage.

Referring to the drawings in detail, and initially to the charge forming apparatus or carburetor shown in FIGURES 1 through 7, the carburetor is inclusive of a body or body member 10 which may be fashioned of die cast metal or of suitable molded resin of a character which is not subject to impairment tor deterioration by hydrocarbon fuels. The body 10 is formed with a longitudinally extending air and fuel mixing passage 12, the mixing passage including a Venturi construction 14 the choke band or zone of maximum restriction being indicated at 15, an air inlet region 16 and an outlet region 18.

Extending across the air inlet region 16 is a shaft 20 supporting a disk-type choke valve 21 secured to the shaft by a screw 22, the shaft being journaled in hollow bosses formed on the body as shown in FIGURE 2. The shaft 20 is provided with a manipulating arm 24 for regulating the position of the choke valve which is employed in starting the engine with which the carburetor is used.

The carburetor body 10 is provided with bosses 26 bored to journally support a shaft 28 extending across the outlet region of the mixing passage and mounting a disk valve 30 held in place by means of a screw 31 which forms a throttle valve for controlling the flow of fuel and air mixture through the outlet. The shaft 28 is provided with a manipulating arm 32 for operating the throttle valve 30.

The outlet end of the carburetor body 10 is formed with a mounting flange 34 for connection with a crankcase of a two cycle engine or which may be connected with the manifold of a four cycle engine, the mounting flange having openings 35 to receive securing bolts (not shown). The air inlet end 16 of the body 10 may, if desired, be provided with an air filter or an air cleaner for screening the air entering the mixing passage.

The body 10 of the carburetor is formed with a shallow fuel chamber or fuel transfer passage 38. A flexible member, membrane or diaphragm 40 extends across and forms one wall of the chamber 38 as particularly shown in FIGURES 3 and 4.

It should be noted that the shallow fuel chamber or passage 38 is placed or disposed as close as possible to the mixing passage 12 in order to reduce the lift to facilitate delivery of the liquid fuel into the mixing passage as hereinafter explained. The diaphragm 40 is preferably formed of a flexible textile material such as Nylon cloth impregnated with a resin or synthetic rubber or oher coating to render the diaphragm impervious.

The diaphragm 40 in the embodiment illustrated is substantially circular. Disposed between the peripheral region of the diaphragm 40 and a flat or planar surface of the carburetor body 10 is an annular gasket 42 to effect a seal between the periphery of the diaphragm and the carburetor body. A plurality of projections 43, one of which is shown in FIGURE 3, project through suitable openings formed in the peripheral region of the diaphragm 40, the peripheral region of a cover plate 44 and the gasket 42 to properly position the gasket, diaphragm and cover plate with respect to the carburetor body 10.

The cover plate 44, preferably formed of sheet metal and of circular contour, is secured to the body 10 by screws 45. The central region of the cover plate 44 is recessed away from the diaphragm to provide a chamber 46 to accommodate flexure or movement of the diaphragm, the chamber 46 being vented to the atmosphere by means of a vent or opening 47 to equalize the pressure in the chamber 46 irrespective of the relative position of the diaphragm 40.

The diaphragm 40 is fashioned to facilitate relative flexure or movement without stretching the material of the diaphragm. The diaphragm is made of very thin highly flexible material to render it sensitive to minute variations or changes in pressure in the fuel chamber 38 to facilitate efficient and uniform delivery of liquid fuel to the mixing passage under aspiration or subatmospheric pressure set up or established in the mixing passage by engine operation.

Means is provided in the carburetor for regulating or controlling the flow of fuel from a supply into the diaphragm chamber or fuel transfer passage 38. It is to be understood that any suitable fuel supply may be utilized such as a fuel tank located to flow fuel by gravity to the carburetor or, if desired a suitable pump may be employed for conveying fuel to the carburetor. As shown in FIGURE 4, the body 10 is fashioned with a hollow boss portion 50 threaded as at 51 to receive a threaded portion of an inlet fitting 53 provided with a shank portion adapted to accommodate a flexible supply hose or other tubular means, the fitting 53 being formed with a fuel inlet passage 54.

Also disposed in the bore in the boss 50 is a hollow sleeve, fitting or valve cage 56 which accommodates a valve body 58 slidably disposed in the sleeve. The valve body 58 is of polygonal cross-section to facilitate flow of fuel along the valve body, one end of the body being formed with a conically-shaped valve portion 60.

The fitting 56 is formed with a recess accommodating an annular valve seat 62 which is preferably formed of semihard synthetic rubber or other material which is resistant to deterioration to hydrocarbon fuels, the end of the inlet fitting 53 securing the sleeve 56 and valve seat 62 in place.

The cone shaped valve 60 extends into and cooperates with the seat 62 for regulating fuel flow controlled by the relative position of the diaphragm. The arrangement of control for the fuel valve 60 embodies a novel lever construction providing a compact arrangement which is reliable in operation. Extending across a recess 64 formed in the body 10 is a pin or shaft 65 having a threaded portion 66 engaging in a threaded bore in the body to maintain the shaft in place.

The pin or shaft 65 forms a fulcrum or pivot for the end of an L-shaped lever 68, the lever being fashioned with a normally horizontal portion or arm 69, a substantially vertical portion 70 and a tubular or curled portion 71 at its end region, the latter surrounding or embracing the pin 65. The L-shaped lever 68 is of the second order of levers and is fulcrumed at one end as shown in FIGURE 4. The vertically disposed portion or leg 70 of the lever as shown in FIGURE 4 is in contact with the end of the valve body 58.

The carburetor body 10 is formed with a recess or bore 73 to accommodate an expansive coil spring 74, an end of which engages the horizontal portion 69 of the lever 68 as shown in FIGURE 4. The port or opening 63 in the valve seat 62 should be of comparatively small diameter and area so that the fuel pressure acting against the cone shaped valve portion 60 is reduced to a minimum thereby increasing the sensitivity of the fuel flow control system.

The distal end region of the portion 69 of lever 68 engages a head 76 of a rivet or member 77, the shank of which extends through openings in a comparatively thin metal reinforcing disk 78, the diphragm 40, and a washer 79, the opposite end of the rivet being swaged as at 80 to secure these components in assembled relation.

It will be apparent from examination of FIGURE 4 that when the diaphragm 40 is flexed toward the mixing passage, the head 76 swings the lever 68 in a clockwise direction about its fulcrum 65, moving the vertical portion 70 in a generally left-hand direction permitting the valve member 58 to move in a left-hand direction and facilitate flow of fuel through the port in valve seat 63 into the diaphragm chamber 38.

Such action compresses the spring 74 and, when the pressure is increased in the diaphragm chamber 38, the spring swings the lever 68 in a counterclockwise direction to bias the valve 60 toward closed position. The upper wall of the fuel chamber 38 is formed with an elongated recess 80 to accommodate swinging movements of the portion 69 of the lever 68.

It should be noted that the diaphragm chamber or fuel transfer chamber 38 is not vented to the atmosphere and fuel from the chamber or passage is delivered into the mixing passage by engine aspiration or reduced pressure in the mixing passage acting upon the fuel chamber 38. Hence there is no predetermined or defined fuel level in the chamber 38 and, as the chamber is comparatively shallow being only sufficient to accommodate movement of the diaphragm 40, a minimum of fuel is contained in the chamber 38 the weight of which has a minimum influence upon the operation of the diaphragm 40.

A main fuel orifice 84 is formed in a projection 85 extending a short distance into the choke band area 15 of the Venturi 14 and forms a main fuel discharge orifice, outlet, port or nozzle for delivering fuel into the mixing passage. The charge forming apparatus or carburetor includes a secondary fuel discharge or delivery system including an idling orifice 86 and a low speed orifice 88 formed in a wall region of the mixing passage, the idling orifice being slightly forward of the closed position of the throttle valve 30 as illustrated in FIGURE 3 for supplying fuel into the mixing passage for engine idling purposes.

An auxiliary chamber 90 is formed in the carburetor body and the orifices 86 and 88 are in communication with the chamber 90, the end of the chamber 90 being closed by a Welsh plug or disk 92. Formed in the carburetor body is a bore or duct 94, the end adjacent the chamber 38 being closed by a cap 95. Also formed in the body is a duct or bore 96, the end adjacent chamber 38 being closed by a cap 97. The ducts 94 and 96 are connected by a communicating channel 98 formed by drilling from the air inlet end of the carburetor, the end of the duct 98 at the right side of the bore 94 as viewed in FIGURE 3 being closed by a plug 100.

As illustrated in FIGURES 5 and 6, the carburetor body 10 is formed with a boss portion 102 which is bored and a wall portion threaded to accommodate a manually adjustable valve member 104 provided with a knurled head 105 for manipulating the valve body.

The bore 106 accommodating the valve body is in communication with the chamber 38 by means of a passage or channel 108 as shown in FIGURE 6, and the bore 106 is in communication with the duct 94 by means of a restricted passage 110.

The valve member 104 is provided with a tapered or needle shaped valve portion 112 which extends into the restricted passage 110 and provides a main adjustment for metering fuel supplied to both the main orifice 84 and the secondary orifices 86 and 88. The body 10 is formed with a boss portion 116 provided with a bore 117 a wall portion of which is threaded to accommodate a second threaded valve body 118, the latter being formed with a knurled head 120 for manually adjusting the same.

The bore 117 is in communication with duct 96 by a restricted passage 122, the valve body 118 being provided with the tapered or needle valve portion 123 which cooperates with the restricted passage 122 to meter, regulate or control fuel flow from the duct 98 and bore 96 to the secondary orifices 86 and 88. Coil springs 124 surround the portions of valve members 104 and 118 and provide friction to retain the valve members in adjusted positions. Sealing rings 125 surround the valve members 104 and 118 to prevent leakage.

A drilled passage or channel 126 is in communication with the bore 117 and the supplemental chamber 90 as shown in FIGURE 5. The passage 126 is formed by drilling through a boss portion 127 as shown in FIGURE 5, and the entrance closed by a plug 128. The needle valve 123 controls the flow or delivery of fuel into the supplemental chamber 90 for discharge through the orifices 86 and 88.

As shown in FIGURE 3, an air bleed passage 130 may be disposed in communication with the air inlet region 16 and the channel or duct 94 for admitting air into the fuel to form an emulsion for discharge therewith through the main nozzle 84. In certain installations it may be desirable to omit the air bleed passage 130 depending upon the particular use of the carburetor.

The operation of the carburetor or charge forming apparatus shown in FIGURES 1 through 7 is as follows: In starting the engine, the choke valve 21 is moved to near closed position and the throttle valve 30 moved to partial or full open position. When the engine is cranked, reduced pressure or aspiration is set up in a mixing passage which is transmitted to the diaphragm chamber 38, flexing the diaphragm toward the mixing passage and opening the inlet valve to admit fuel to chamber 38 and cause fuel flow from the diaphragm chamber 38 past the valve 112 through restricted passage 110 into the duct 94, the fuel being discharged into the choke band 15 of the Venturi through the main orifice or primary outlet 84.

Some air is bled into the fuel in the duct 94 through the air bleed passage 130 forming an emulsion. After the engine is started, the choke valve 21 is progressively moved to open or near open position as the engine becomes heated. During operation of the engine at intermediate or high speeds, fuel is continuously delivered through the main orifice 84 into the mixing passage.

Through contact of the button or head 76 of the rivet 77 with the arm 69 of lever 68, the lever is swung by upward movement of the diaphragm in a clockwise direction about its fulcrum 65 as viewed in FIGURE 4, moving the angle portion 70 of the lever in a left-hand direction and permitting the valve body 58 to move in a left-hand direction admitting fuel from the supply through fitting 54, the port in valve seat 63 into the diaphragm chamber 38 for delivery into the mixing passage.

The valve 112 may be adjusted by manipulation of the knurled knob 105 to meter, regulate or control the maximum fuel flow to both the primary and secondary fuel discharge system. When the engine is operating at idling speed with the throttle valve 30 in substantially closed position as shown in FIGURE 3, fuel flows from the duct 94 through the duct or channel 98, bore 96, restricted passage 122 past the tapered valve 123 through the channel 126 and supplemental chamber 90 to the idling orifice 86.

When the throttle 30 is moved to partial open position, fuel may be delivered from the low speed orifice 88 and the idle orifice 86. During delivery of fuel through the idle orifice, the low speed orifice 88 or both, the pressure in the Venturi 14 is high enough whereby fuel is not delivered through the main orifice 84 until the engine speed increases through further opening movement of the throttle 30 and air flow through the Venturi 14 is increased to set up a substantially reduced pressure effective on the nozzle 84 to initiate fuel delivery from the main fuel orifice 84.

As the engine speed increases, delivery of fuel through the secondary orifice system, that is, through orifices 86 and 88 gradually diminishes and at high engine speeds only a small proportion of the fuel is delivered through the secondary orifice system. The needle valve 123 may be adjusted by manipulating the knob 120 to regulate or meter fuel flow to the supplemental chamber 90 of the secondary fuel discharge system, the valve member 112 however regulating the maximum amount of fuel for delivery through the main orifice as well as through the secondary orifice system.

During engine operation, a subatmospheric or reduced pressure exists in the diaphragm chamber 38 by reason of the aspiration of the engine setting up air flow through the mixing passage of the carburetor. Through this action the relative position of the diaphragm 40 is influenced by the amount of reduced pressure in the chamber 38 to regulate the extent of opening of the inlet valve 60 and thereby regulate the amount of fuel entering the diaphragm chamber 38 in accordance with the requirements of the engine.

The higher the air velocity through the Venturi 14, the greater will be the reduced pressure effective in the chamber 38, and a proportionately greater amount of fuel will be withdrawn from the reservoir or diaphragm chamber 38 into the mixing passage 12. A reduction in pressure in the Venturi 14 is transmitted through the bore or channel 94, passages 110 and 108 to the diaphragm chamber 38, elevating the diaphragm 40 a greater distance and hence effecting increased movement of the valve 60 toward open position, thereby increasing the flow of liquid fuel from the supply into the carburetor.

Where the air passage 130 is employed, air bleeds into the fuel in the duct 94 and a fuel emulsion is delivered through the main orifice 84. When the engine idling orifice 86 is in operation, or the idling orifice and the low speed orifice 88 are in operation, an emulsion of fuel and air is delivered through the secondary orifice system as air bleeds into the duct 94 from the mixing passage through the main orifice 84 due to the fact that the pressure in the Venturi, with the throttle 30 in closed or nearly closed position is higher than the pressure at the left-hand or engine side of the throttle 30 as viewed in FIGURE 3.

The extent or amount of air bleeding through the main nozzle 84 is greatest at low engine speeds and such air bleeding is progressively reduced as the engine speed increases and the aspiration at the Venturi 14 increases. Through this type of metering system, the secondary orifices 86 and 88 may be made appreciably larger than conventional practice where the mixture supplied thereto is air bled as herein described. This renders the idling orifice and idling mixture less sensitive and fosters better idling of the engine.

The L-shaped or angle lever 68 provides for a compact fuel inlet control system and is apparently more stable especially at high engine speeds. This is attributable to the fulcrum position of the lever being at one end while the opposite end region engages the head 76 secured to the diaphragm so that vibratory movement or a tendency toward vibratory movement of the lever is dampened by the diaphragm. This is of particular advantage where the carburetor is utilized with lawnmower engines where the mower traverses rough terrain and is subjected to substantial vibration.

Another form of the charge forming apparatus of the invention is illustrated in FIGURES 8 through 13. In this form the carburetor body is of substantially the same shape as that shown in FIGURE 1, and the diaphragm and lever arrangement for controlling the fuel flow into the carburetor is substantially the same as that hereinbefore described in connection with the form shown in FIGURES 1 through 7.

In this form the carburetor body 10a is provided with an air inlet region 16a, an air outlet region 18a and a mixing passage 12a. The mixing passage includes a Venturi 14a having a band or zone of maximum restriction 15a. The air inlet is provided with a choke valve 12a mounted on a rotatable shaft 22a, and the mixture outlet 18a provided with a disk type throttle valve 30a mounted upon a rotatable shaft 28a.

The carburetor body 10a is formed with a shallow chamber or fuel passage 38a, one wall of which is formed by the diaphragm 40a, the diaphragm being of the same character as that shown in FIGURE 3. A sheet metal cover plate 44a for the diaphragm is secured to the body 10a by means of screws 45a. The central region of the plate 44a is depressed providing a vented chamber 46a accommodating movement of the diaphragm 40a.

With particular reference to FIGURE 12, the construction is inclusive of a fuel inlet fitting 53a, a sleeve or fitting 56a which encloses a ported valve seat 62a. A valve body 58a is slidably accommodated within the hollow interior of the sleeve 56a, the valve body having a needle valve portion 60a cooperating with the valve seat 62a.

An L-shaped or angle lever 68a fulcrumed upon pin 65a has its distal end in contact with the head 76a of member 77a secured to the diaphragm 40a. An expansive coil spring 74a serves to bias the lever 68a in a direction to urge the valve 60a toward closed or fuel flow interrupting position. The lever 68a is of the second order of levers, being fulcrumed at one end as illustrated in FIGURE 12.

The fuel metering system and channels for conveying fuel from the diaphragm chamber 38a for delivery into the mixing passage include a duct or passage 94a which receives fuel from the chamber 38a through passages 108a, 106a and 110a, these passages being shown in FIGURE 10. The adjustable needle valve 112a, which is manipulated by a knurled knob 105a, is arranged to meter, regulate or control the flow of fuel from chamber 38a into the duct 94a for delivery into the Venturi 14a of the mixing passage through the main nozzle or orifice 84a.

The secondary fuel delivery system includes an idling orifice 86a, a low speed orifice 88a, the supplemental chamber 90a and fuel passage 126a in communication with the bore 117a as shown in FIGURE 13. The bore 117a is in communication with the bore 96a through a passage 122a. A needle valve 123a, which may be adjusted by manipulation of a knob 120a regulates or controls the fuel flow to the chamber 90a for delivery through the secondary discharge orifices.

The fuel for the secondary orifice system is obtained by way of a passage 135 in communication with the bore 96a and the bore 106a which accommodates the body portion of the valve 112a as shown in FIGURE 13. The passage 135 is formed by drilling into the body of the carburetor in an angular direction shown in FIGURE 13, and the entrance of the drilled opening closed by a plug 137. It should be noted that the fuel supplied to the secondary orifice system is obtained from the diaphragm chamber 38a through the passage 108a, the bore 106a and passage 135 independently of the fuel flow to the duct 94a.

Thus the fuel delivered to the high speed orifice 84a is controlled or metered by the valve member 112a, while the fuel delivered to the secondary orifices is controlled or metered solely by manipulation of the valve 123a. In the several forms of the invention disclosed herein, the diaphragm or fuel chamber is disposed as close as possible to the mixing passage in order to reduce the lift or aspiration required to elevate fuel through the discharge orifices into the mixing passage.

In the form of the invention illustrated in FIGURES 8 through 13, the fuel metering and conveying system for the main orifice 84a include a passage or passages of such size as to establish a liquid seal provided by the capillary action of the liquid fuel. This feature is of particular importance under certain operating conditions as it prevents air bleeding in reverse direction through the main orifice 84a to the secondary orifices 86a and 88a when the latter are delivering fuel into the mixing passage.

This enables the carburetor or charge forming apparatus to be operated in extreme angular positions. The principles of operation of a capillary seal or liquid seal arrangement are disclosed and described in my Patent 2,841,372 granted July 1, 1958.

In the arrangement shown in FIGURES 8 through 13, a liquid or capillary seal tends to form in the main orifice 84a and in the annular area at the region surrounding the needle valve 112a between the cylindrical wall of the valve passage 110a and the adjacent peripheral region of the needle valve 112a. It is found that the lift for usual operation of the carburetor is that pressure which will support a column of water about three-eighths of an inch in heighth, which is substantially under the maximum stress at which the seal or capillary seal will be fractured or broken.

It is found that the liquid seal due to the capillary effect of fuel in the metering passage 110a and in the main orifice passage 84a is effective without fracture up to a pressure required to support a column of water about one inch in heighth. As the differential pressure usually present in chamber 38a during operation of the carburetor is approximately that pressure required to support a column of water three-eighths of an inch in heighth, the normal operation is well within the pressure limit to maintain a liquid or capillary seal in the high speed fuel delivery system effective to prevent back bleeding from the mixing passage through the main orifice 84a and into the secondary fuel delivery system.

The fuel in the main orifice 84a and in the annulus surrounding the needle valve 112a in the restricted passage 110a seals or blocks air flow from the mixing passage into the secondary fuel delivery system. Through this arrangement the carburetor may be operated at engine idling and low speeds in extreme angular positions as fuel will be prevented from flowing by gravity through the main orifice 84a into the mixing passage by the liquid or capillary seal.

The operation of the arrangement shown in FIGURES 8 through 13 is as follows: The engine is started by closing the choke valve 21a and opening the throttle valve 30a and cranking the engine. After starting, the choke valve 21a is opened. Fuel is delivered through the high speed orifice 84a into the mixing passage 12a, the fuel being supplied from the diaphragm chamber 38a through passages 108a, 106a and 110a and duct 94a. The fuel delivered to the main orifice 84a is metered or regulated by adjusting the position of the valve 112a, this valve metering or regulating only the fuel flow to the main orifice 84a.

When the throttle 30a is in substantially closed to engine idling position, the secondary orifice 86a delivers fuel for engine idling purposes from the chamber 90a. When the throttle is partially opened, fuel is delivered from the low speed orifice 88a as well as the idling orifice 86a. The fuel supplied to the secondary orifices 86a and 88a is regulated or metered solely by the position of the valve 123a as the secondary orifice system derives its fuel supply from the diaphragm chamber 38a independently of the valve 112a.

When the throttle 30a is in full open or substantially open position, the aspiration in the Venturi 14a is increased by higher engine speed and the liquid or capillary seal provided by the fuel in the main orifice 84a and adjacent the valve 112a is broken by the substantial reduction in pressure effective on the orifice 84a whereby fuel is delivered through the high speed orifice 84a into the mixing passage, and the percentage of fuel delivered through the secondary orifices 86a and 88a is progressively reduced with increased engine load and speed.

In idling or low speed engine operating positions of the throttle 30a, the pressure effective in the diaphragm chamber 38a is insufficient to fracture the capillary seal thus preventing back bleeding of air through the main orifice 84a into the secondary fuel delivery system. The flexure or movement of the diaphragm 40a controlled by the degree of reduced pressure or aspiration in the mixing passage is operable through the lever 68a to regulate the fuel flow from a supply past the inlet valve 60a in the same manner as hereinbefore described in connection with the form of the invention shown in FIGURES 1 through 7.

An air bleed 130a shown in FIGURE 9 may be employed to admit air into the duct or passage 94a for mixing with the fuel prior to its delivery through the main orifice 84a into the mixing passage. It is to be understood that in certain uses or installations of the carburetor, the air bleed 130a may be omitted. The air bleed 130a is of comparatively small size and therefore has no appreciable effect upon the formation and maintenance of the capillary or liquid seal in the high speed fuel delivery system.

In the arrangement as illustrated in FIGURE 13 the secondary fuel delivery system receives fuel through the passage 135 in communication with the bore 106a which receives fuel from the diaphragm chamber 38a through the passage 108a. It is to be understood that the fuel for the secondary fuel delivery system may be obtained through direct communication between the bore 96a and the diaphragm chamber 38a by eliminating the closure 97a or forming an opening in the closure.

In either arrangement, the liquid seal which forms under the conditions hereinbefore described in the main orifice 84a and the annular region adjacent the valve 112a is effective to prevent back bleeding of air through the primary or high speed delivery system.

Another form of carburetor of the invention is illustrated in FIGURES 14 through 19. A significant feature of the arrangement shown therein is the provision of a double Venturi construction in the mixing passage. In this form, the body 140 of the carburetor is of the same general configuration as in the forms of the invention hereinbefore described. The arrangement includes an air and fuel mixing passage 12b having an air inlet region 16b and a mixture outlet region 18b at the end of a carburetor adapted to be connected with an engine crankcase or intake manifold.

The mixing passage is inclusive of a main Venturi 14b having a band or zone of maximum restriction 15b. Formed within the lower portion of the main Venturi as viewed in FIGURE 15 is a generally cylindrically-shaped boss portion 142, the uppermost surface region of which is subtsantially coincident with the axis of the main Venturi.

The boss portion 142 is of hollow configuration and is shaped interiorly to form a second or supplemental Venturi 144, the inlet region of which opens into the air inlet region 16b.

The supplmental Venturi is provided with a choke band or zone of maximum restriction 146, the outlet end 148 of the supplemental Venturi opening toward the mixture outlet 18b, and the lower interior surface defining the outlet region 148 blending with the lower outlet surface of the main Venturi 14b. The main orifice 84b of the primary fuel delivery system opens into the supplemental Venturi 144 at a region in or adjacent the zone of maximum restriction 146. This arrangement provides improved distribution of the fuel in the air streams moving through both the main and supplemental Venturis.

The air inlet region 16b is equipped with a choke valve 21b mounted upon a rotatable shaft 22b, and the mixture outlet region 18b is provided with a throttle valve 30b mounted upon a rotatable shaft 28b, the throttle being shown in near closed or engine idling position in FIGURE 15. As in the other forms of the invention, the carburetor is formed with a shallow fuel or diaphragm chamber 38b, one wall of which is formed by the flexible diaphragm 40b. The diaphragm is held in place by a cover plate 44b secured to the carburetor body by screws 45b, the plate 44b having a depressed central region forming a vented chamber 46b accommodating movement of the diaphragm.

As shown in FIGURE 18, the carburetor is provided with a threaded bore to receive an inlet fitting 53b adapted to be connected by tubular means with a fuel supply. The bore also accommodates a fitting or sleeve 56b in which is slidably supported an inlet valve body 58b formed with a cone shaped valve portion 60b adapted to cooperate with a ported valve seat 62b. An L-shaped lever 68b is fulcrumed at one end by a pin or shaft 65b, the distal end of the lever being in contact with a head or button 76b provided on a member 77b carried by the diaphragm 40b. An expansive coil spring 74b biases the lever 68b in a counterclockwise direction to normally urge the valve 60b toward the valve seat 62b.

The fuel duct system for conveying fuel from the diaphragm chamber 38b to the mixing passage includes a main or primary orifice or nozzle 84b in communication with a duct 94b as shown in FIGURE 15. The high speed or primary nozzle 84b receives its fuel from the diaphragm chamber 38b through passages 108b, 106b and 110b as shown in FIGURE 17. Disposed in the passage 110b is a valve body provided with a needle valve portion 112b which cooperates with the restricted passage 110b for metering or regulating fuel flow to the main nozzle 84b. The valve 110b is provided exteriorly of the carburetor with a knurled knob 105b for adjusting the valve.

The secondary fuel delivery system includes an idling orifice 86b and a low speed orifice 88b opening into a supplemental chamber 90b. The chamber 90b is in communication with a bore 117b as shown in FIGURE 19, the bore 117b being in communication with a bore 150 through a restricted passage or channel 122b. The bore 150 opens into the fuel or diaphragm chamber 38b as shown in FIGURE 15. A needle valve 123b carried by a valve body threadedly disposed in the bore 117b is provided with a knurled knob 120b for adjusting the valve 123b.

By adjusting this valve, the fuel flow to the secondary fuel delivery system comprising orifices 86b and 88b is metered by adjusting the relative position of the needle shaped valve 123b in the passage 122b. The high speed orifice 84b is supplied with fuel from chamber 38b independently of the fuel supplied to the secondary orifices 86b and 88b. An air bleed passage 130b shown in FIGURE 15 may be utilized in communication with the air inlet 16b and the bore 94b for admitting air into the fuel prior to its discharge through the main orifice 84b.

The operation of the carburetor or charge forming apparatus shown in FIGURES 14 through 19 is as follows: The engine is started in the same manner as described in connection with the other forms of the invention by closing the coke valve 21b and opening the throttle valve 30b. Fuel is delivered through the main orifice 84b with the throttle 30b in substantial open position, the fuel supplied to the main orifice flowing from the chamber 38b through passages 108b, 106b and 110b past the regulating or metering valve 112b and bore 94b through the discharge orifice 84b and into the small or supplemental Venturi 144.

This action continues during moderate and high speed engine operation. The fuel and air mixture in the supplemental Venturi 144 is distributed through the outlet region of the primary or main Venturi 14b so that a homogeneous mixture of air and fuel is delivered through the mixture outlet 18b to the engine.

When the throttle valve 30b is in near closed or engine idling position or opened to secure low speed engine operation, fuel is delivered through one or both of the secondary orifices 86b and 88b. The chamber 90b receives fuel through passages 126b, 117b, 122b and bore 150 from the fuel chamber 38b independently of the high speed orifice system.

Under the influence of the reduced or subatmospheric pressure in the mixing passage, the diaphragm 40b is flexed toward the mixing passage, such action moving the lever 68b about its fulcrum to permit opening of the valve 60b admitting fuel from a supply into the chamber 38b, the extent of movement of the diaphragm and hence the rate of fuel flow into the chamber being dependent upon the rate of fuel delivery into the mixing passage.

The arrangement shown in FIGURES 14 through 19 embodies a capillary or liquid fuel seal for the main orifice when either or both of the secondary orifices are in operation. As shown in FIGURE 17, the valve 112b cooperates with the restricted passage 110b to meter the delivery of fuel through the main orifice 84b.

However when the pressure is increased in the supplemental and primary Venturis by reducing the throttle opening bringing the secondary orifices 86b or 88b into operation, the capillary action of the fuel in the main nozzle and the annular region around the needle portion of the valve 112b in the passage 110b sets up or establishes a liquid seal preventing reverse flow or back bleeding of air from the mixing passage into the unvented diaphragm chamber 38b.

Hence this form of carburetor will function in extreme angular positions as the diaphragm 40b is controlled solely by aspiration in the mixing passage. The double Venturi arrangement as illustrated provides improved engine operation particularly at open throttle operation under heavy loads.

While the supplemental Venturi is preferably disposed in the main Venturi at a region close to the diaphragm chamber 38b so as to be operable with minimum lift, it may be disposed at other positions in the mixing passage if desired.

FIGURES 20 through 25 illustrate a modified form of carburetor of the invention. The carburetor body 140c is provided with a mixing passage 12c which includes an air inlet region 16c, a primary or main Venturi 158, a supplemental Venturi 144c and a mixture outlet 18c. The air inlet region 16c is provided with a choke valve 21c mounted upon a rotatable shaft 22c and the mixture outlet region 18c provided with a throttle valve 30c mounted upon a rotatable shaft 28c.

The carburetor body 140c is formed with a shallow fuel or diaphragm chamber 38c, one wall of the chamber 38c being formed by the flexible diaphragm 40c of the same construction as in the other forms of the invention hereinbefore described. The diaphragm 40c is held in place by a cover plate 44c secured to the carburetor body by screws 45c. The central region of the cover plate 44c is depressed to provide a vented chamber 46c accommodating flexing movements of the diaphragm 40c.

The diaphragm 40c, being under the influence of aspiration in the mixing passage 12c, controls the fuel inlet valve arrangement shown in FIGURE 24 for admitting fuel from a supply into the chamber 38c. A nipple or fitting 53c, threaded into a bore in a boss portion of the carburetor, is adapted to connected by a flexible tube or other tubular means with a fuel supply.

Also disposed in the bore receiving the fitting 53c is a sleeve 56c, the hollow interior thereof accommodating a movable valve body 58c provided with a cone shaped valve portion 60c. The sleeve 56c is provided with a recess accommodating an annular valve seat member 62c through which fuel may flow past the valve 60c into the chamber 38c.

As shown in FIGURE 24, the fuel flow control arrangement includes the L-shaped lever 68c fulcrumed at one end by a shaft or pin 65c, the distal end of the lever being in engagement with a head 76c of a rivet or member 77c carried by the diaphragm 40c. The vertical portion of the lever 68c engages the end of the valve body 58c. An expansive coil spring 74c engages the lever 68c to bias the lever toward valve-closing position.

Disposed in the region of the mixing passage nearest to the diaphragm 40c is a cylindrical boss portion 142c in which is fashioned a supplemental or small Venturi 144c having a choke band or region of maximum restriction 146c. The main orifice or outlet 84c opens into the choke band 140c of the supplemental Venturi and is in communication with a duct or passage 164 formed in the body 140c. Pressed or fitted into the duct 164 is a thin metal sleeve or fitting 160 formed at its lower end with an inwardly extending peripheral flange 161.

The fitting 160 is disposed in the upper end of the duct or bore 164 and encloses a ball check member or valve means 162. The flange 161 forms a seat for the valve 162 and defines a central circular opening of smaller diameter than the diameter of the check valve 162 whereby the check valve is normally maintained within the fitting.

It should be noted that the axis of the duct 164 and hence the normal axis of position of the check ball 162 is eccentric with or spaced laterally from the axis of the main orifice 84c so that irrespective of the position of the check ball 162 within the fitting 160 the check ball does not block or impede the flow of liquid fuel from the duct 164 to the main orifice or outlet 84c into the supplemental Venturi 144c. The ball 162 forms a valve means for closing the opening in the fitting 160 defined by the flange 161 preventing back bleeding of air from the mixing passage in a reverse direction through the orifice 84c.

The secondary fuel discharge system includes an idling orifice 86c and a low speed orifice 88c, both being in communication with a supplemental chamber 90c. The supplemental chamber 90c is in communication with a bore 117c by means of a passage 126c as shown in FIGURE 25. The bore 117c is in communication with a duct 168 by a restricted passage 122c shown in FIGURES 22 and 25.

Threadedly disposed in the bore 117c is a valve body having a needle-shaped valve portion 123c extending into the restricted passage 122c, the valve body having a knurled knob 120c for adjusting the relative position of the needle valve 123c. By this means, fuel flow to the secondary orifice system is metered or regulated by adjustment of the valve 123c. The duct 168 is in communication with the duct 164 by a passage 166, the latter being drilled from the air inlet end of the carburetor and the entrance closed by a plug 169 as shown in FIGURE 21.

With particular reference to FIGURE 23, a threaded bore 106c receives a valve body formed with a needle valve portion 112c which extends into a restricted passage 110c in communication with the bore 106c and the duct 164. The valve body of the needle valve 112c is provided with a knob 105c for adjusting the relative position of the needle valve 112c. The bore 106c is in communication with the diaphragm chamber 38c through a passage 108c.

Fuel is delivered into the passage or duct 164 through the passage 108c, bore 106c, past the needle valve 112c and through the restricted passage 110c. The valve 112c is adjusted to a position in accordance with the fuel requirements of the engine. It should be noted that the needle valve 112c regulates or meters the fuel for delivery both through the main orifice 84c and through the secondary orifices 86c and 88c, and the needle valve 123c provides a secondary adjustment for fuel flow to the secondary orifice system.

An air bleed 130c between the air inlet region 16c and the duct 164 shown in FIGURE 21 is adapted to bleed air into the fuel in the duct 164 for admixing with the fuel discharged through the main and secondary orifices. As stated in connection with other forms of the invention, under certain uses of the carburetor the air bleed 130c may be omitted.

The check ball 162 is preferably fashioned of lightweight material as for example a resinous material such as nylon, a polyamid resin, or Delrin, a formaldehyde resin. Through the use of a check ball 162 as a valve of lightweight material, the ball is readily lifted from its seat on the flange 161 under the influence of asipration or reduced pressure in the mixing passage.

The operation of the carburetor or charge forming apparatus shown in FIGURES 20 through 25 is as follows: The engine is cranked while the choke valve is closed and the throttle valve 30c opened. The aspiration set up in the mixing passage moves the diaphragm 40c permitting fuel from a supply to flow past the inlet valve 60c into the chamber 38c thence through the passages 108c, 106c, 110c and duct 164, upwardly past the ball valve 162 and discharged through the main orifice 84c into the supplemental or small Venturi 144c.

The air and fuel mixture formed in the small Venturi flows into the air moving through the primary or main Venturi 158 providing a fuel and air mixture. The extent of flexure or upward movement of the diaphragm 40c is dependent upon the amplitude of aspiration or reduced pressure established in the mixing passage 12c by the speed of the engine. The extent of diaphragm movement controls the extent of opening of the valve 60c and hence the flow rate of fuel into the diaphragm fuel chamber 38c.

When the throttle valve 30c is in engine idling position as shown in FIGURE 21, or in partial open low speed position, the fuel from the duct 164 flows to the secondary orifices 86c and 88c through the channels or ducts 166, 168, restricted passage 122c past the needle valve 123c through passage 126c into the chamber 90c. During operation of the secondary fuel delivery system, back bleeding of air from the mixing passage through the main or primary orifice 84c is prevented by the ball check member 162 is disposed on the seat provided by the flange. Air from the air bleed passage 130c is supplied to the fuel forming an emulsion for delivery through the orifices.

The fuel flow control for both the main orifice 84c and the secondary orifices is provided through the adjustable needle valve 112c, and a secondary adjustment for the fuel delivered through the secondary orifices is provided by needle valve 123c. Both valves are manually adjustable by manipulating the grip portions 105c and 120c. The carburetor illustrated in FIGURES 20 through 25 has particular utility where the engine is subjected to heavy load conditions at comparatively low speeds such as encountered in garden tractors or a motorcycle engine propelling a motorcycle up a steep incline.

If it is desired to provide a fuel emulsion for delivery through the main nozzle 84c only, the air bleed 130c may be drilled to enter the sleeve 160 at a zone above the flange 161 so that air bleeding of the fuel discharged through the main orifice 84c takes place within the sleeve 160. Where such modification is employed, the fuel will be delivered from the duct 164 through the secondary orifices without admission of air into the fuel prior to its delivery into the mixing passage.

Another modification of the carburetor of the invention is illustrated in FIGURES 26 through 31. In this arrangement, the carburetor body 10d is formed with a mixing passage 12d which includes a Venturi 14d having a choke band or maximum zone of restriction 15d, an air inlet region 16d and a mixture outlet region 18d. The air inlet region of the mixing passage is provided with a choke valve 21d mounted upon a rotatable shaft 22d, and the outlet region of the mixing passage provided with a throttle valve 30d mounted upon a rotatable shaft 28d.

The carburetor body is fashioned with a shallow fuel chamber 38d, a diaphragm 40d forming one wall of the fuel chamber. The diaphragm is held in place by a cover plate 44d secured to the body by screws 45d, the central region of the closure member 44d being depressed providing a chamber 46d accommodating flexure or movement of the diaphragm 40d.

The fuel inlet control arrangement operated by movement of the diaphragm 40d is illustrated in FIGURE 30 and is inclusive of a nipple or fitting 53d threaded into a bore in the carburetor body and which is adapted to be connected by means of a flexible tube or other means with a fuel supply.

Also threaded into the bore accommodating the fitting 53d is a tubular member or sleeve 56d, the hollow central region slidably accommodating a valve body 58d, the body having a conically shaped valve portion 60d. The sleeve 56d is formed with a recess accommodating a ported valve seat 62d which is held in place by the fitting 53d.

The L-shaped lever 68d, fulcrumed at one end upon the shaft 65d, has its distal end engaging the head 76d of member carried by the diaphragm 40d. The vertical leg portion of lever 68d engages the end of the valve body 58d. An expansive coil spring 74d engaging the lever 68d normally biases the lever in a counterclockwise direction urging the inlet valve 60d toward the valve seat 62d. The arrangement shown in FIGURES 26 through 31 is inclusive of an accelerating well or a fuel reservoir within the carburetor between the fuel chamber 38d and the main fuel discharge orifice 84d.

With particular reference to FIGURE 27 the carburetor body is formed with a bore or chamber 181, the upper end region of which is of reduced diameter and into which is pressed or disposed a tubular fitting or member 175. The tubular fitting 175 is provided with a sleeve or hollow shank portion 179 of lesser diameter which depends or extends downwardly into the chamber 181, the portion 179 terminating a short distance above a Welsh plug 180 isolating the chamber 181 from direct communication with the diaphragm or fuel chamber 38d.

The upper portion of larger diameter of the fitting or tubular member 175 accommodates a valve means in the form of a check ball 177, which is of a diameter slightly larger than the diameter of the interior region 183 defined by the depending portion 179 of the sleeve. The region of reduced diameter of the tubular member 175 at the juncture of the depending portion 179 therewith provides a seat for the ball check valve 177, the latter functioning to prevent back bleeding of air from the mixing passage through the main orifice 84d when the secondary fuel delivery system is in operation.

The check ball or valve member 177 is preferably formed of lightweight material as for example a resin such as nylon or Delrin or other suitable material. The secondary fuel delivery system includes an engine idling orifice 86d, a low speed orifice 88d, both of which are in communication with a supplemental chamber 90d. The supplemental chamber 90d is in communication with a threaded bore 117d by means of a passage 126d, the bore 117d accommodating a valve body member formed with a needle valve portion 123d and a manipulating grip portion 120d.

The bore 117d is in communication with a bore or duct 168d through a restricted passage 122d, the needle valve 123d extending into and being adjustable relative to the passage 168d for metering or regulating the fuel delivered to the secondary orifice system. The duct 168d, as shown in FIGURE 7, is in communication with the chamber 181 by means of a channel or duct 166d which is drilled into the carburetor body from the air inlet end 16d, the entrance to the drilled passage being blocked by a plug 169d.

Fuel is supplied from the chamber 38d to both the main or primary orifice 84d and the secondary orifice system through the arrangement shown in FIGURE 29. A threaded bore 106d formed in the body is in communication with the chamber 38d by a fuel passage 108d. The bore 106d is in communication with the chamber 181 by means of a restricted passage 110d. A needle valve 112d is formed on a valve body adjustably mounted within the bore 106d, the needle portion 112d extending into the passage 110d to regulate fuel flow into the chamber 181.

The body of the needle valve 112d is provided with a manipulating grip portion 105d for adjusting the relative position of the needle valve. The needle valve 112d controls the flow of fuel from the fuel chamber or diaphragm chamber 38d to both the primary and secondary fuel delivery systems.

It will be apparent from FIGURE 27 that the duct or passage 166d is in communication with the upper end region of the chamber 181 so that during operation of the secondary orifices 86d or 88d the chamber 181 is maintained filled with fuel from the reservoir 38d whereby the chamber 181 forms an accelerating well for subsequent rapid discharge of fuel through the main orifice 84d into the mixing passage 12d. In this arrangement the aspiration effective on the secondary orifice system elevates fuel from the chamber 38d to fill the well 181 with fuel.

It should be noted that the main or high speed orifice 84d is offset from the axis of the tubular fitting 175 so that the check ball 177 does not at any time block the orifice 84d.

An air bleed 130d may be arranged between the upper end of the chamber 181 and the air inlet region 16d of the carburetor to admit air into the chamber 181 for mixing with the fuel delivered through the main orifice 84d after the fuel in the accelerating well 181 is substantially exhausted following an initial surge or discharge of fuel therefrom through the main orifice 84d to obtain rapid acceleration of the engine by temporarily enrichening the mixture of fuel and air in the mixing passage.

Due to the fact that the channel 166d is in communication with the extreme upper end of the accelerating well 181, the well will be maintained substantially filled with liquid fuel whenever the secondary orifice system is delivering fuel into the mixing passage and little or no fuel is being delivered into the mixing passage through the main outlet or nozzle 84d.

Thse operation of the charge forming apparatus or carburetor shown in FIGURES 26 through 31 is as follows: The choke valve 21d is closed and the throttle valve 30d opened substantially during cranking of the engine to establish a reduced or subatmospheric pressure in the mixing passage 12d. The reduced pressure influences the diaphragm 40d to be flexed upwardly as viewed in FIGURES 27 through 30 swinging the lever 68d in a clockwise direction to permit opening of the inlet valve 60d.

Fuel flows from a supply past the valve 60d and through the fuel chamber 38d into the well 181 thence upwardly through the passage 183 defined by the sleeve portion 179 past the check ball 177 and through the primary or high speed nozzle 84d into the air stream moving through the mixing passage. As the engine is warmed, the choke valve 21d is progressively moved toward open position. Fuel for the secondary orifices 86d and 88d is conveyed from the well 181 through passages or ducts 166d, 168d, 122d, 117d and 126d into the supplemental chamber 90d.

When the orifice 86d or orifice 88d or both are in operation, the pressure in the Venturi 14d is increased and the check ball 177 is seated and prevents reverse flow or back bleeding of air from the mixing passage through the primary orifice 84d. In the metering system of this form of the invention, the needle valve 112d regulates or controls the maximum fuel flow to both the primary and secondary orifice systems, and supplementary control of the fuel flow to the secondary system being regulated by adjustment of the needle valve 123d.

When the throttle valve 30d is suddenly opened a substantial amount from an engine idling or low speed position of the throttle to accelerate the engine, the pressure in the mixing passage in the Venturi 14d is decreased and the pressure adjacent the secondary orifices 86d and 88d is increased. Under these conditions the high aspiration in the Venturi effects rapid delivery of the fuel in the well 181 past the check valve 177 and through the main orifice 84d to provide a temporarily enrichened mixture to accelerate the speed of the engine.

Thus an amount of liquid fuel in the well 181 is available for engine accelerating purposes at all times during operation of the secondary orifice system. The aspiration acting on the nozzle 84d is effective to move the diaphragm 40d upwardly to further open the fuel inlet valve 60d and increase the flow of fuel into the fuel transfer or diaphragm chamber 38d and well 181 for continuous discharge through the main orifice 84d during continued high speed engine operation.

When the throttle is moved to closed or nearly closed position from high speed or open throttle position, the pressure in the mixing passage adjacent the secondary orifices is reduced, the pressure in the Venturi 14d is increased, fuel delivery through the main orifice 84d ceases, the ball check 177 is again seated, the well 181 fills with liquid fuel and the fuel in the well moves through the passage 166d to the secondary orifices 86d and 88d.

The well 181 is replenished with fuel by aspiration effective at the secondary orifices whereby an amount of fuel in the well is available for an accelerating charge through the main orifice 84d. In installations where the air bleed 130d is employed, an emulsion of fuel and air is delivered through the main orifice 84d as soon as the amount of liquid fuel in the accelerating well 181 is discharged through the main orifice 84d.

FIGURE 32 is a transverse sectional view illustrating a modification of the arrangement for controlling the fuel flow into the carburetor. The carburetor body 10e is provided with a boss 50e at one side thereof having a bore which is threaded to accommodate a fitting or nipple 53e adapted to be connected by means of a flexible tube with a fuel supply.

The threaded portion of the bore in the boss 50e also accommodates a sleeve or hollow member 56e in which is slidably mounted a valve body 58e having a cone shaped valve portion 60e. The cone shaped valve portion is adapted for cooperation with an annular valve seat 62e contained in a recess formed in the sleeve 56e and held in place by the fitting 53e.

A closure member 44e secures the diaphragm in place, the member 44e being secured to the body 10e by means of screws 45e. The central region of the plate 44e is depressed to provide a chamber 46e to accommodate flexure of the diaphragm 40e, the chamber 46e being vented to the atmosphere.

The L-shaped lever 68e is fulcrumed upon the pin 65e, the vertical portion 70e of the lever contacting the end of the valve body 58e. The horizontal portion 69e of the lever is in contact with the head 76e of a member 77e carried by the diaphragm 40e. The carburetor body 10e is formed with a bore 190 in which is disposed an expansive coil spring 191. As shown in FIGURE 32, the coil spring engages a distal end portion of the lever extending beyond the region of contact of the lever 68e with the head 76e.

The spring 191 normally biases the lever 68e in a counterclockwise direction about its pivot shaft or fulcrum 65e to bias the valve 60e toward the valve seat 62e. The spring 191 engaging the distal end of the lever 68e facilitates the use of a proportionately lighter spring. It is to be understood that the fuel inlet control mechanism shown in FIGURE 32 may be utilized with any of the forms of carburetor hereinbefore described.

FIGURE 33 is a transverse sectional view illustrating a modified form of fuel inlet valve control system for regulating the flow of fuel into a diaphragm chamber. The carburetor body 195 is formed with a boss portion 198 which is provided with a bore accommodating a hollow sleeve 200, the axis of the sleeve being substantially normal to the plane of the flexible diaphragm 226. The sleeve 200 is positioned within the bore by means of a ledge 202, a gasket 204 being disposed between the end of the sleeve and the ledge 202.

The lower end of the sleeve 200 is formed with an inwardly extending flange 205 which defines a seat for a cone shaped inlet valve member 208 which is secured upon a rod 206. The upper end region of the sleeve 200 is recessed to accommodate a plate 210 formed with openings to facilitate flow of fuel and a central opening forming a guide means for the rod 205. A coil spring 212 is disposed within the interior of the sleeve 200, the upper end engaging the plate 210 which is pressed into the recess in the sleeve 200, the other end of the spring engaging the valve member 208, the spring normally urges the valve member toward the seat provided by the flange 205.

Also threaded into the boss portion 198 is a fitting 216 adapted to be connected by a tubular means with a fuel supply or fuel tank. A flexible diaphragm 226 forms one wall of the shallow fuel chamber 225, the diaphragm being of similar construction to that shown in the other forms of the invention.

A cover plate 230 for the diaphragm is secured to the body by means of screws 231, one of which is shown in FIGURE 33. The central portion of the cover plate 230 is depressed to form a chamber 232 accommodating flexure or movement of the diaphragm 226, the chamber being vented as at 234.

A lever 220 of the second order of levers is disposed so as to transfer movements of the diaphragm to the valve member 208 through contact of the lever with an end of the rod 205. The lever 220 is fulcrumed at one end upon a pin 224, a curled or cylindrical portion 222 of the lever embracing the pin 224. The distal end of the lever 220 engages a head 228 of a member carried by the diaphragm 226. The rod 206 engages the lever at a region between its fulcrum 222 and the point of engagement of the lever with the head 228.

The arrangement shown in FIGURE 33 for controlling the flow of liquid fuel into the chamber of the carburetor may be used with any forms of the carburetor hereinbefore described. The diaphragm 226 is flexed by aspiration or differential pressure existing in the mixing passage 196 in the same manner as hereinbefore described in connection with the other forms of the invention. When the diaphragm 226 is flexed upwardly by engine aspiration, the lever 220 moves in a clockwise direction about its fulcrum 224 elevating the cone shaped valve member 208 from the seat provided by the flange 206 to permit fuel flow through the fitting 216, the hollow interior of the sleeve 200, past the valve 208 into the diaphragm or fuel transfer chamber 225.

The main and secondary orifice systems hereinbefore described in the other forms of the invention may be utilized in conjunction with the fuel inlet control system shown in FIGURE 33. The pressure of the expansive coil spring 212 biases the valve member 208 toward valve seating position.

It should be noted that in all forms of the invention herein described the fuel inlet control system embodies a second class lever viz. a lever fulcrumed at one end, engaged by a spring at a region spaced from the fulcrum.

It is apparent that, within the scope of the invention, modifications and different arrangements may be made other than as herein disclosed, and the present disclosure is illustrative merely, the invention comprehending all variations thereof.

I claim:

1. In combination, charge forming apparatus including a body formed with a mixing passage, a fuel chamber formed in the body, a throttle valve in the mixing passage, a flexible diaphragm having one side forming a wall of the fuel chamber and its other side having an unsupported center portion, said mixing passage being formed with a main Venturi, a supplemental Venturi of reduced size in the main Venturi and having its axis parallel to and offset from the axis of the main Venturi toward the diaphragm, an orifice opening into the supplemental Venturi, a fuel inlet in said body, a valve for said fuel inlet, a lever fulcrumed in the fuel chamber engageable with the inlet valve, said lever being engaged with and actuated by the diaphragm for transmitting movement of the diaphragm through the lever to position the inlet valve for controlling fuel flow into the fuel chamber, a portion of said lever extending substantially parallel to said diaphragm, pivot means for said lever, said pivot means being offset from the central axis of said diaphragm, means biasing the inlet valve toward closed position, said fuel chamber being unvented whereby the diaphragm is actuated solely by differential pressure in the mixing passage, and passage means for conveying fuel from the fuel chamber to the orifice.

2. In combination, charge forming apparatus as in claim 1 and including:
    (a) spring means acting on the parallel portion of said said lever.

3. In combination, charge forming apparatus as in claim 1 and including:
    (a) spring means acting on the parallel portion of said lever and positioned between said pivot means and the central axis of said diaphragm.

4. In combination, charge forming apparatus as in claim 1 and wherein:
    (a) said lever is of the second order of levers.

5. In combination, charge forming apparatus as in claim 1 and wherein:
    (a) said lever is L-shaped.

6. In combination, charge forming apparatus including a body formed with a mixing passage, a fuel chamber formed in the body, a throttle valve in the mixing passage, a flexible diaphragm having one side forming a wall of the fuel chamber and its other side having an unsupported center portion, said mixing passage being formed with a main Venturi, a supplemental Venturi of reduced size contained within the main Venturi and having its axis parallel with and offset from the axis of the main Venturi toward the diaphragm, a main orifice opening into the supplemental Venturi, a secondary orifice opening into the mixing passage, a fuel inlet in said body, a valve for said fuel inlet, a fulcrum pin extending into the fuel chamber, a lever in the fuel chamber fulcrumed upon the pin and engageable with the inlet valve, said lever being engaged by the diaphragm for transmitting movement of the diaphragm through the lever to position the inlet valve for controlling fuel flow into the fuel chamber, a portion of said lever extending substantially parallel to said diaphragm, said fulcrum pin being offset from the central axis of said diaphragm, a spring biasing the inlet valve toward closed position, said fuel chamber being unvented whereby the diaphragm is actuated solely by differential pressure in the mixing passage, passage means for conveying fuel from the fuel chamber to the main and secondary orifices, and means to prevent back bleeding of air through the main orifice when the secondary orifice is delivering fuel into the mixing passage.

References Cited by the Examiner

UNITED STATES PATENTS

| | | | |
|---|---|---|---|
| 2,141,365 | 12/1938 | Schuttler. | |
| 2,252,958 | 8/1941 | Bicknell | 261—34 |
| 2,638,330 | 5/1953 | Morgenroth | 261—64 X |
| 2,796,838 | 6/1957 | Phillips. | |
| 2,724,584 | 11/1955 | Armstrong | 261—69 |
| 2,733,902 | 2/1956 | Phillips | 261—41 |
| 2,774,582 | 12/1956 | Bracke | 261—41 |
| 2,796,838 | 6/1917 | Phillips. | |
| 2,823,905 | 2/1958 | Brown | 261—37 |
| 2,841,372 | 7/1958 | Phillips | 261—41 |
| 2,898,095 | 8/1958 | An | 261—23 |
| 2,985,159 | 5/1961 | Moseley | 261—72 X |
| 3,072,390 | 1/1963 | Phillips | 261—35 |
| 3,118,009 | 1/1964 | Phillips | 261—35 |

HARRY B. THORNTON, *Primary Examiner.*

RONALD R. WEAVER, *Examiner.*